United States Patent
Jones et al.

(10) Patent No.: US 9,836,719 B2
(45) Date of Patent: *Dec. 5, 2017

(54) CONSUMER DEMAND-BASED INVENTORY MANAGEMENT SYSTEM

(71) Applicant: Wal-Mart Stores, Inc., Bentonville, AR (US)

(72) Inventors: Nicholaus A. Jones, Fayetteville, AR (US); Marc A. Fletter, Bentonville, AR (US); Matthew A. Jones, Bentonville, AR (US); Daniel R. Shields, Cave Springs, AR (US); Robert J. Taylor, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,102

(22) Filed: Apr. 18, 2017

(65) Prior Publication Data

US 2017/0220993 A1 Aug. 3, 2017

Related U.S. Application Data

(63) Continuation of application No. 15/096,660, filed on Apr. 12, 2016, now Pat. No. 9,659,275.

(60) Provisional application No. 62/147,221, filed on Apr. 14, 2015.

(51) Int. Cl.
*G06K 5/00* (2006.01)
*G06Q 10/08* (2012.01)
*G06K 7/10* (2006.01)

(52) U.S. Cl.
CPC ....... *G06Q 10/087* (2013.01); *G06K 7/10861* (2013.01)

(58) Field of Classification Search
CPC ............ G06K 5/00; G06K 19/00; G06K 7/10; G06K 9/22; G06F 17/00; G06Q 30/30; G06Q 90/00

(Continued)

(56) References Cited

U.S. PATENT DOCUMENTS 5,237,496 A 8/1993 Kagami
6,341,269 B1 1/2002 Dulaney (Continued)

OTHER PUBLICATIONS

Reddit; "Why the F#©% does pressing delete on the telxon freeze the whole damn screen?!" URL:http://www.reddit.com/r/walmart/comments/2fvk5z/why_the_f_does_pressing_delete_on_the_telxon/; Jan. 29, 2015; 3 pages.

(Continued)

*Primary Examiner* — Edwyn Labaze
(74) *Attorney, Agent, or Firm* — Fitch, Even, Tabin & Flannery LLP

(57) ABSTRACT

In some embodiments, methods and systems of managing products at a retail sales facility include scanning a product in a stocking cart at the retail sales facility using a hand-held electronic device including a processor. At least two of the following three functions may be performed based on the scanning of the product. First, the stocking cart may be audited by comparing scanned data to data contained in an inventory management database. Second, a determination of whether the item is on a pick list may be made, which may include determining a demand for the scanned product to arrive at a decision whether to store the product in the stock room or place it on a shelf on the sales floor. Third, if the item is to be stored in the stock room, a determination of whether identical items are stored in bins in the stock room may be made.

20 Claims, 4 Drawing Sheets

(58) Field of Classification Search
USPC ...... 235/380, 375, 487, 385, 472.01, 462.45
See application file for complete search history.

(56) References Cited

U.S. PATENT DOCUMENTS

| | | | |
|---|---|---|---|
| 8,103,538 B2 | 1/2012 | Bamberg | |
| 2002/0174001 A1 | 11/2002 | Henry | |
| 2002/0178074 A1* | 11/2002 | Bloom | G06Q 10/08 |
| | | | 705/26.81 |
| 2004/0249497 A1* | 12/2004 | Saigh | E04H 14/00 |
| | | | 700/216 |
| 2006/0164247 A1 | 7/2006 | Overhultz | |
| 2008/0183599 A1 | 7/2008 | Hill | |
| 2010/0241492 A1* | 9/2010 | Eglen | G06Q 30/02 |
| | | | 705/4 |
| 2011/0029344 A1 | 2/2011 | Weiler | |
| 2012/0190386 A1* | 7/2012 | Anderson | G01C 15/04 |
| | | | 455/456.3 |
| 2014/0201041 A1 | 7/2014 | Meyer | |
| 2014/0333761 A1* | 11/2014 | Porter | G06Q 30/06 |
| | | | 348/135 |
| 2015/0178671 A1 | 6/2015 | Jones | |
| 2016/0101936 A1* | 4/2016 | Chamberlin | G05B 19/402 |
| | | | 700/214 |

OTHER PUBLICATIONS

U.S. Appl. No. 15/096,660; Notice of Allowance dated Jan. 18, 2017.
U.S. Appl. No. 15/096,660; Office Action dated Sep. 16, 2016.

* cited by examiner

CONSUMER DEMAND-BASED INVENTORY MANAGEMENT SYSTEM

RELATED APPLICATIONS

This application claims the benefit of U.S. application Ser. No. 15/096,660, filed Apr. 12, 2016, which in turn claims the benefit of U.S. Provisional Application No. 62/147,221, filed Apr. 14, 2015, which are incorporated herein by reference in its entirety.

TECHNICAL FIELD

This invention relates generally to managing inventory at retail locations and, in particular, to systems and methods for managing inventory based on a consumer demand.

BACKGROUND

Retail locations typically employ multiple inventory management associates that perform different tasks related to inventory management and stocking. One associate may unload/remove items from a truck that delivers the items and place the unloaded items into stocking carts. Another associate may be responsible for taking the stocking cart to the sales floor and placing the items onto the shelves on the sales floor. Yet another associate may be responsible for taking the items remaining on the stocking cart and sorting the "overstock" items into one or more storage bins in the stock room. Still another associate may be responsible for determining whether there is a need for more items on the shelves on the sales floor and retrieving the "overstock" items from the stock room and delivering the items from the stock room to the display shelf on the sales floor.

One disadvantage of using several inventory management associates to independently perform separate stocking tasks as described above is decreased inventory management efficiency. For example, the associate binning the "overstock" items in the stock room typically does not go onto the sales floor to check available shelf space and thus does not know if the "overstock" items being binned can be instead displayed on a shelf on the sales floor. This may lead to undesired situations where the shelves on the sales floor are not fully stocked with items while a number of such items that could be displayed on the shelves and displayed to the consumers are stored in bins in the stock room.

BRIEF DESCRIPTION OF THE DRAWINGS

Disclosed herein are embodiments of systems, apparatuses and methods pertaining to systems and methods for managing inventory based on a consumer demand. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for managing product inventory at retail locations. In some embodiments, systems and methods described herein can determine whether an "overstock" item (e.g., overstock from the sales floor, product returns, or new shipments received from deliveries) that is scanned by an inventory management or stocking associate should be binned in the stockroom or moved to a shelf on the sales floor. If it is determined that the scanned item should be moved back to the sales floor (e.g., the overstock condition was incorrect or the demand has changed since it was determined to move the items back to the stockroom), an alert is provided to the binning associate. There are several options to make this determination including: (1) comparing demand for the item at the time of the decision to return the item to the stockroom or at the time of the delivery of the item to how much of the item has been binned since that decision or delivery; and (2) same as 1 but factor in the sales that have occurred since the decision to return items to the stockroom or since the delivery. If associate ignores an alert to move the item to the shelf on the sales floor, a data point can be logged to set to a pick for the item and/or adjust the demand for the item. Such data points can be used to set an alert for items coming back to the stock room or items being unloaded from the next delivery truck. In addition, such data points can be used to determine a metric for the quality of stocking work by the inventory management associates at the retail location.

Figure 1:
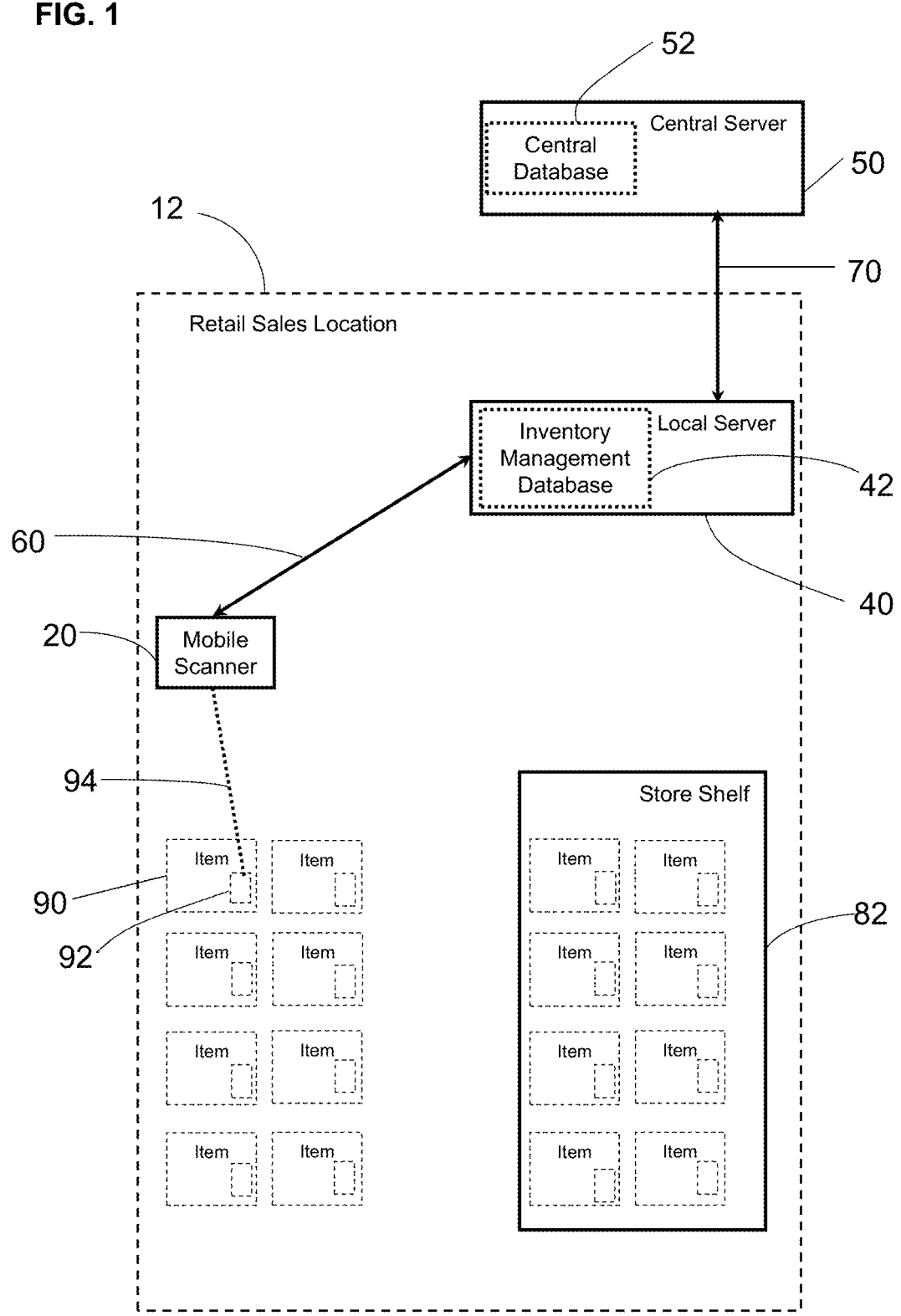
FIG. 1 is a diagram of a retail sales facility product management system in accordance with some embodiments.

Referring to FIG. 1, one embodiment of a system 10 for evaluating and managing an inventory of consumer products at a retail sales facility 12 is shown. The retail sales facility 12 may be any place of business such as a store or warehouse where consumer products are stocked and/or sold. The exemplary system 10 includes a mobile scanning device or scanner 20 configured to scan items 90 located in stocking bins 80 at the retail sales facility 12.

The illustrated system 10 also includes a local (on-site) server 40 in two-way communication with the mobile scanning device 20 via a connection 60, and a remote (central) server 50 in two-way communication with the local server 40 via a connection 70. The connections 60 and 70 may be wired or wireless connections. It will be appreciated that optionally, the mobile scanning device 20 may be in two-way communication with the central server 50 over a wireless connection. It will also be appreciated that the local server 40 and the central server 50 do not have to communicate to each other directly, but may communicate to each other via an intermediate server or other device.

The mobile scanning device or scanner 20 may be a hand-held retail scanner or another hand-held electronic device, for example, a mobile phone, that is configured to scan retail items. The mobile scanner 20 may have a control unit 22 including a processor (for example, a microprocessor or a microcontroller) electrically coupled via a connection 23 to a memory 24 and via a connection 25 to a power supply 26. The control unit 22 may be incorporated into a physical structure of the hand-held mobile scanner 20 or may be located at the local server 40, central server 50, or any other device in communication with the mobile scanner 20.

The processor of the control unit 22 may also be electrically coupled via a connection 27 to a sensor such as a reader 28 configured to detect and/or read information on an identifying label or indicator 92 located on the packaging of a retail item 90 when the mobile scanner 20 is placed in direct proximity to the retail item 90. The reader 28 may be a radio frequency identification (RFID) reader, an optical reader, a barcode reader, or the like. It will be appreciated that the reader 28 may be incorporated into a physical structure of the hand-held device 20 or may be a stand-alone device in communication with the hand held device 20.

As can be seen in FIG. 1, the mobile scanner 20 may scan an identifying indicator 92 on a product 90 (e.g., an "overstock" product) at the retail sales facility 12. For example, the mobile scanner 20 may be used by a binning associate to scan an identifying indicator 92 on a product 90 that is located in a stocking bin, stocking cart, or a sorting area in a stock room of the retail sales facility 12, in a product unloading area of the retail sales facility 12, or any other location where "overstock" products may be temporarily stored prior to being placed into storage bins in the stock room or onto shelves 82 on the sales floor of the retail sales facility 12. The product identifying indicator 92 may be a label, tag, or the like including a barcode, radio frequency identification (RFID), or the like that permit a user (e.g., binning associate) to scan the item 90 with the mobile scanner 20 at the retail sales facility 12 by communicating via a communication pathway 94 (e.g., radio waves) with the barcode or RFID 92 of the item 90 to obtain identifying information regarding the scanned item.

Figure 2:
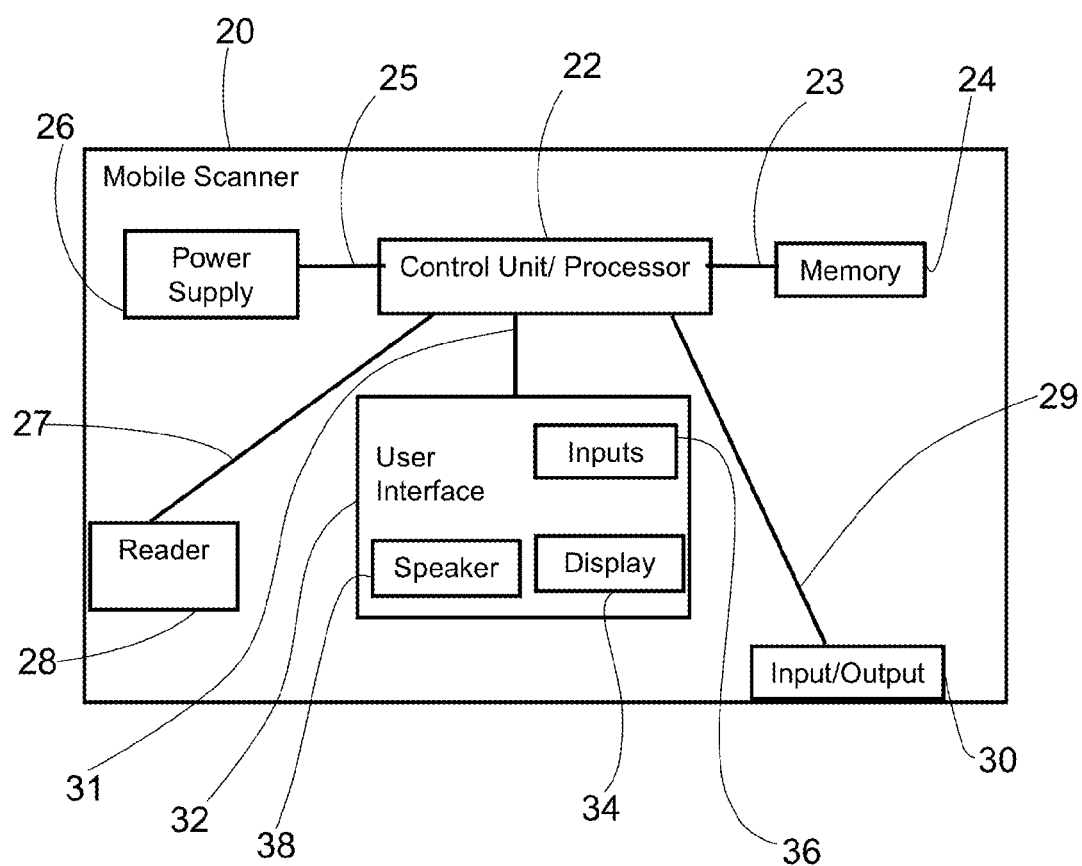
FIG. 2 is a functional diagram of a mobile scanner in accordance with several embodiments.

As shown in FIG. 2, the control unit 22 of the mobile scanner 20 is electrically coupled via a connection 29 to an input/output 30 that can receive signals (e.g., commands, inventory database information) from the local (on-site) server 40 or from any other source, for example, the central station or server 50 located remotely to the retail sales facility 12 that can communicate with the mobile scanner 20, for example, via a wireless connection. The input/output 30 of the mobile scanner 20 can also send signals (e.g., item scan information including information identifying a scanned item) to various devices in communication with the mobile scanner 20, for example, the local server 40, the remote server 50, or any other device in wired or wireless communication with the mobile scanner 20.

In the embodiment shown in FIG. 2, the control unit 22 of the mobile scanner 20 is electrically coupled via a connection 31 to a user interface 32, which may include a visual display or display screen 34 (e.g., LED screen) and/or button input 36 that provide the user interface 32 with the ability to permit a user such as a stock room, binning, or another inventory management associate to manually control the mobile scanner 20 by inputting commands for the mobile scanner 20 to execute, for example, via touch-screen and/or button operation or voice commands. The display screen 34 can also permit the user to see various menus, options, and/or alerts displayed by the mobile scanner 20. The user interface 32 of the mobile scanner 20 may also include a speaker 38 that may provide audible feedback (e.g., alerts) to the user.

Figure 3:
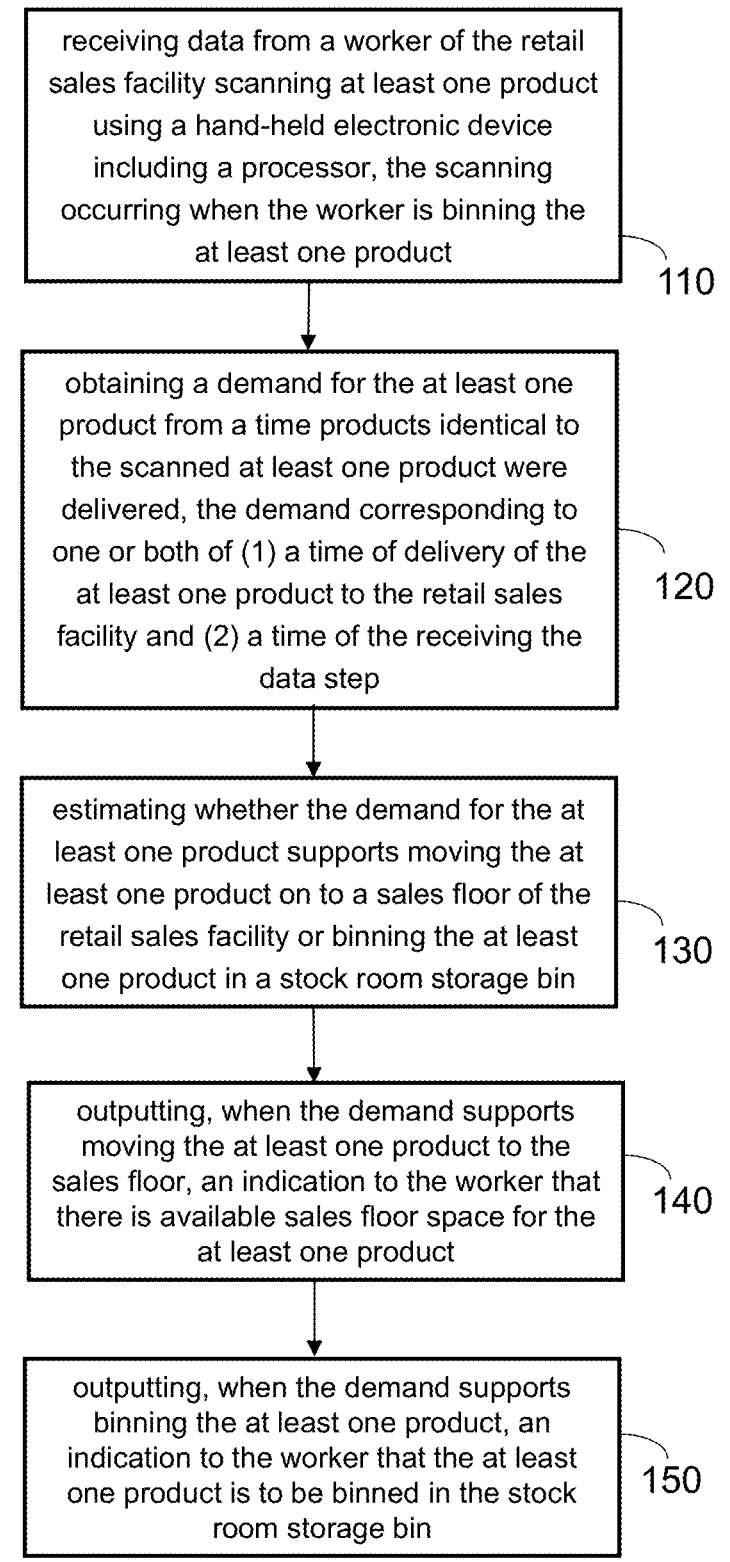
FIG. 3 is a flow chart diagram of a process in accordance with some embodiments.

With reference to FIGS. 1-3, one method 100 of operation of the system 10 to evaluate products 90 at a retail facility will now be described. For exemplary purposes, the method is described in the context of the system of FIG. 1, but it is understood that embodiments of the method may be implemented in this or other systems. Generally, as shown in FIG. 3, the method 100 includes receiving data from a worker of the retail sales facility 12 scanning at least one product 90 using a hand-held electronic device 20 including a processor, with the scanning occurring when the worker is binning the at least one product 90 (step 110). The method 100 further includes obtaining a demand for the at least one product 90 from a time products identical to the scanned at least one product 90 were delivered, where the demand corresponds to one or both of (1) a time of delivery of the at least one product 90 to the retail sales facility 12 and (2) a time of the receiving the data step (step 120).

Next, the method 100 includes estimating whether the demand for the at least one product 90 supports moving the at least one product 90 on to a sales floor of the retail sales facility 12 or binning the at least one product 90 in a stock room storage bin (step 130). Further, the method 100 includes outputting, when the demand supports moving the at least one product 90 to the sales floor, an indication to the worker that there is available sales floor space for the at least one product 90 (step 140). In addition, the method includes outputting, when the demand supports binning the at least one product 90, an indication to the worker that the at least one product 90 is to be binned in the stock room storage bin (step 150). These steps are described in more detail below.

In one embodiment, when an item 90 in the stocking bin 80 (located in the stock room or any other location at the retail sales facility 12) is scanned using the mobile scanner 20, the processor of the control unit 22 of the mobile scanner 20 may be programmed to cause the mobile scanner 20 to communicate with the local server 40 by sending an appropriate query or signal via the input/output 30 and through the connection 60 to the local server 40. It will be appreciated that the scanned item 90, which represents an "overstock" item initially determined by an inventory management associate not to fit on a shelf 82 on the sales floor, may be located in a stocking bin, stocking cart, consolidation cart, or the like, and may be located in the stock room, on the sales floor, in a product unloading area, or another suitable location at the retail sales facility 12.

The signal or query sent from the mobile scanner 20 to the local server 40 may include data representing information that identifies the scanned item 90 and obtained by scanning the identifying indicator 92 of the item 90 via the reader 28 of the mobile scanner 20. In response, the local server 40 may send, via a connection 60, a signal to the mobile scanner 20 including information related to a demand for the scanned item 90. The information regarding the demand for the scanned item 90 may be stored in an inventory management database 42 on the local server 40, in a central database 52 on the central server 50, or on any other server or device configured for communication with the mobile scanner 20.

Generally, the inventory management database 42 may include data related to demand for the item 90 such as the total units sold of the item 90 at the retail sales facility 12 on any given day or per hour, for example. In one embodiment, the inventory management database 42 is configured to keep a running demand for the items 90 at the retail sales facility 12 since delivery of the products 90 to the retail sales facility 12 or a time when a decision is made that the items 90 represent "overstock" until a time when the product 90 is scanned. In one embodiment, when a stocking associate scans an "overstock" item 90 to be binned using the mobile scanner 20, the reader 28 of the mobile scanner 20 reads the identifying indicator 92 of the item 90 and identifies the scanned item 90. The identification of the item 90 may be based on logic programmed within the mobile scanner 20 or may require the mobile scanner 20 to communicate with the local server 40 to access information in the inventory management database 42. Upon identification of the scanned item 90, the processor of the control unit 22 of the mobile scanner 20 is programmed to determine space availability for that item 90 on a shelf 82 on the sales floor at the retail sales facility 12 by analyzing and/or calculating a demand for the product 90 at the retail sales facility 12 within a predetermined time interval.

For example, the processor of the control unit 22 of the mobile scanner 20 can be programmed to determine whether space is presently available for the scanned item 90 on a shelf 82 on the sales floor by analyzing and/or calculating a consumer demand (e.g., units sold) for the item 90 from a time when the item 90 was delivered to the retail sales facility 12 (e.g., on a preceding day or the present day) and/or from a predetermined time of day when the item 90 was designated as being "overstock" (e.g., after delivery of the item to the retail sales facility 12 and prior to closing of the retail sales facility 12 on the preceding day) to a time of the scanning of the item 90 via the mobile scanner 20.

In response to a determination by the processor of the control unit 22 that space for the scanned item 90 is presently available on the shelf 82 on the sales floor of the retail sales facility 12, the processor of the control unit 22 may be programmed to send a signal to the speaker 38 of the mobile scanner 20 to cause the speaker 38 to generate an audible alert to inform the user (e.g., stock room or binning associate) that space is available on a shelf 82 on the sales floor (or that items identical to the scanned item 90 are already stored in stock room bins). It will be appreciated that instead of an audible alert such as a "beep" (or spoken words such as "Pick" or "In Another Bin" or the like) via the speaker 38, the processor of the control unit 22 may be programmed to send a signal to the visual display 34 of the mobile scanner 20 to cause the visual display 34 to visually indicate to the user that space on a shelf 82 on the sales floor of the retail sales facility 12 is presently available for the scanned product 90. Such an audible or visual alert to the stocking associate regarding available space on the shelf 82 on the sales floor would indicate to the associate that the scanned item 90 is to be returned to the shelf 82 on the sales floor of the retail sales facility 12 instead of being placed in a storage bin in the stock room at the retail sales facility 12.

The processor of the control unit 22 may be programmed in various ways to analyze and/or calculate a demand for the scanned item 90 and to determine whether the mobile scanner 20 should generate an alert for the binning associate to not stock the item 90 in a storage bin in the stock room, but place the item 90 on a cart for return to the shelf 82 on the sales floor of the retail sales facility 12. One exemplary calculation may be to take the demand for the scanned item 90 at the time of delivery of the item 90 to the retail sales facility 12 and compare the demand to how many items 90 have been binned in the stock room of the retail sales facility 12 since that delivery. Such a calculation can be expressed as: (quantity of items delivered)−(items binned since the first delivery was made+quantity of items being binned). If the resulting number of items 90 is smaller than the demand for the items 90 at the delivery, the mobile scanner 20 would beep or visually alert the associate that some of the items 90 may be placed on the shelf 82 on the sales floor instead of a storage bin in the stock room. Notably, in this calculation, the time of delivery can be taken as being within a predetermined maximum time window relative to the time of the scan of the item 90. The predetermined maximum time window may be, for example, from the time of scan of the item 90 relative to the last delivery of the item 90 (e.g., on a preceding day, for example, within 24, 18 hours, 12 hours, 9 hours, or less) to the retail sales facility 12 to keep the calculation as current as possible instead of being based on historical data that is one week, two weeks, or a month old. In addition, such a calculation calculates a demand for the item 90 based on "in-store" data, in other words, data based on actual demand for the item 90 at the actual retail sales facility 12 instead of relying on historical demand at other retail locations in the region.

Another way to determine a running demand for the scanned item 90 can be achieved by using the same algorithm to calculate the demand for the items 90 at the delivery of the items 90 to the retail sales facility 12 as described in the preceding paragraph, but also adding the number of items 90 sold since the last delivery of the items 90 to the calculated demand for the items 90 at the delivery to account for any actual sales of the items 90. In one approach, instead of looking at a time of last delivery as the starting point of the predetermined time interval, the algorithm may only analyze the last event as being the starting point of the predetermined time interval. For example, the starting point can be considered as the time when the item 90 is either "picked" from a storage bin in the stock room or delivered to the retail sales facility 12. In this scenario, upon a scan of the item 90 with the mobile scanner 20, the algorithm would take the number of items 90 being presently binned and compare that number to the demand for the items 90 at the pick. The pick could be either the last pick or all picks within a predetermined time interval of the scan of the item 90.

For instance, one possible decision tree may be used to determine if the alert or beep by the mobile scanner 20 in response to scanning an item 90 is appropriate: if the sum of sales (e.g., total number of items sold) since the last event (e.g., last pick or last delivery of these items) and the sales floor demand at the last event is greater or equal to the quantity of the items being binned, then if, ((current sales floor demand+sales since last 2 events) % casepack) is greater or less than 0, then if (current sales floor demand+sales since last 2 events) % casepack+sales since last event is greater or equal to the quantity of the items being binned, then the mobile scanner 20 will generate an audible alert. CasePack represents the number of items 90 in a case, if applicable. Another way the demand for the scanned item may be calculated is if ((current sales floor demand+sales since last 2 events) % casepack) equals to 0, then if (sales since last event+sales since last 2 events) are greater or equal to the quantity of the items being binned, then the mobile scanner 20 will generate an audible alert.

In one embodiment, when a mobile scanner 20 generates a visual (e.g., via the display 34) or audible (e.g., via the speaker 38) alert to the stocking associate to inform the associate that the item 90 being binned may be stocked on the shelf 82 on the sales floor instead of the stock room, the mobile scanner 20 presents the associate with an option to acknowledge the alert, for example, by pressing on the display screen 34 or on one of the inputs 36 of the mobile scanner 20. When the stocking associate acknowledges the audible or visual alert, the processor of the control unit 22 of the mobile scanner 20 is programmed to designate the scanned product 90 as being "picked," i.e., removed from being designated for binning to a storage bin in a stock room. In such a case, the processor of the control unit 22 may be programmed to send a signal via the input/output 30 of the mobile scanner 20 to the local server 40 to indicate that the scanned item 90 as being "picked" such that the inventory management database 42 (which, as discussed above, may be stored on the local server 40 or on the central server 50) may be updated accordingly.

In other words, if upon scanning an item 90 during binning by the mobile scanner 20, the processor of the control unit 22 of the mobile scanner 20 determines that the shelf 82 on the sales floor of the retail sales facility 12 presently has available space for the scanned product 90, the processor of the control unit 22 can send a signal to the inventory management database 42 to remove the scanned item 90 from being listed as being located in the bin 80 and to indicate that the scanned item 90 is to be placed on a cart (e.g., "pick" cart) that goes to the sales floor of the retail sales facility 12, where an associate can place the scanned item 90 onto the sales floor shelf 82.

The inventory management database 42 may receive signals and data from the mobile scanner 20 and/or the central server 50 and may store and update information regarding, for example, the total inventory of units of the item 90 at the retail sales facility 12, total number of units of the item 90 in storage bins and/or stocking bins in the stock room, and/or the shelf 82 on the sales floor, and/or any other location at the retail sales facility 12. As such, the scanning of an item 90 during binning by the mobile scanner 20 and the associated update of the inventory management database 42 regarding the location of the item 90 effectively provides an audit of the items 90 at the retail sales facility 12 such that a binning associate scanning the item 90 in the future would know whether the item 90 is located in its proper location or misplaced.

In one embodiment, the processor of the control unit 22 of the mobile scanner 20 may be programmed to create a log entry in response to a generation of each alert to the inventory management associate, and store this log entry in the memory 24 of the mobile scanner 20. Alternatively, the processor of the control unit 22 may be programmed to cause the input/output 30 of the mobile scanner 20 to send a signal including such log entry information to the local server 40 and/or the central server 50 for storage. If the inventory management associate does not acknowledge the alert generated by the mobile scanner 20, or does not pick the scanned item 90 from being binned and does not enter information into the system 10 (via the mobile scanner 20) indicating that the scanned item 90 is being picked from being binned, the processor of the control unit 22 of the mobile scanner 20 is programmed to log the associate's lack of acknowledgment or failure to pick the item from the binning quantity, thereby generating log data indicating that the inventory management associate did not properly respond to the alert.

In one approach, if the associate ignores the beep generated by the mobile scanner 20 in response to scanning an item 90 during the binning of the item 90 by the associate, the processor of the control unit 22 of the mobile scanner 20 may be programmed to not only generate and store a data point or log entry in its memory 24 as discussed above, but may also generate an automatic "pick" for the scanned item 90 within the system 10. In other words, even if the binning associate does not acknowledge the alert by the mobile scanner 20 that the scanned item 90 should be picked from being binned in the stock room and should be placed on the shelf 82 on the sales floor, the processor of the control unit 22 of the mobile scanner 20 can send a signal to the local server 40 to cause the inventory management database 42 to be updated to indicate the scanned item 90 as being "picked," not stored in a storage bin in the stock room. As such, the next inventory management associate who scans the item at the retail sales facility 12 using the mobile scanner 20 would be informed that the item 90 should not be in a storage bin in the stock room, but should instead be on a shelf 82 on the sales floor.

The processor of the control unit 22 can also be programmed to adjust the demand for the item 90 in the inventory management database 42, or create a report or metric to monitor the quality of stocking work being done by the inventory management associates at the retail sales facility 12. Such reports or metrics may enable associates and/or management personnel to evaluate the quality of stocking at the retail sales facility 12. For example, such reports may indicate trends in quality of stocking done by the associates at the retail sales facility 12 overall, or at certain departments of the retail location, allowing the management at the retail sales facility 12 to assign, reassign, or hire new personal to improve the quality of stocking of items at the retail sales facility 12.

In one approach, if in response to a scan of an "overstock" item 90 during binning by an inventory management associate using the mobile scanner 20, the processor of the control unit 22 of the mobile scanner 20 determines (or receives a signal) that no shelf space on the sales floor of the retail sales facility 12 is presently available for the scanned item 90, the mobile scanner 20 may obtain information regarding specific locations (e.g., bins) in the stock room where such items 90 may be already stored. Systems and methods relating to determining whether an overstock item being binned is already binned in the stock room and the associated consolidation of items are described in more detail in related application entitled "OVERSTOCK INVENTORY MANAGEMENT SYSTEM," filed on Apr. 14, 2015, incorporated by reference herein in its entirety.

Figure 4:
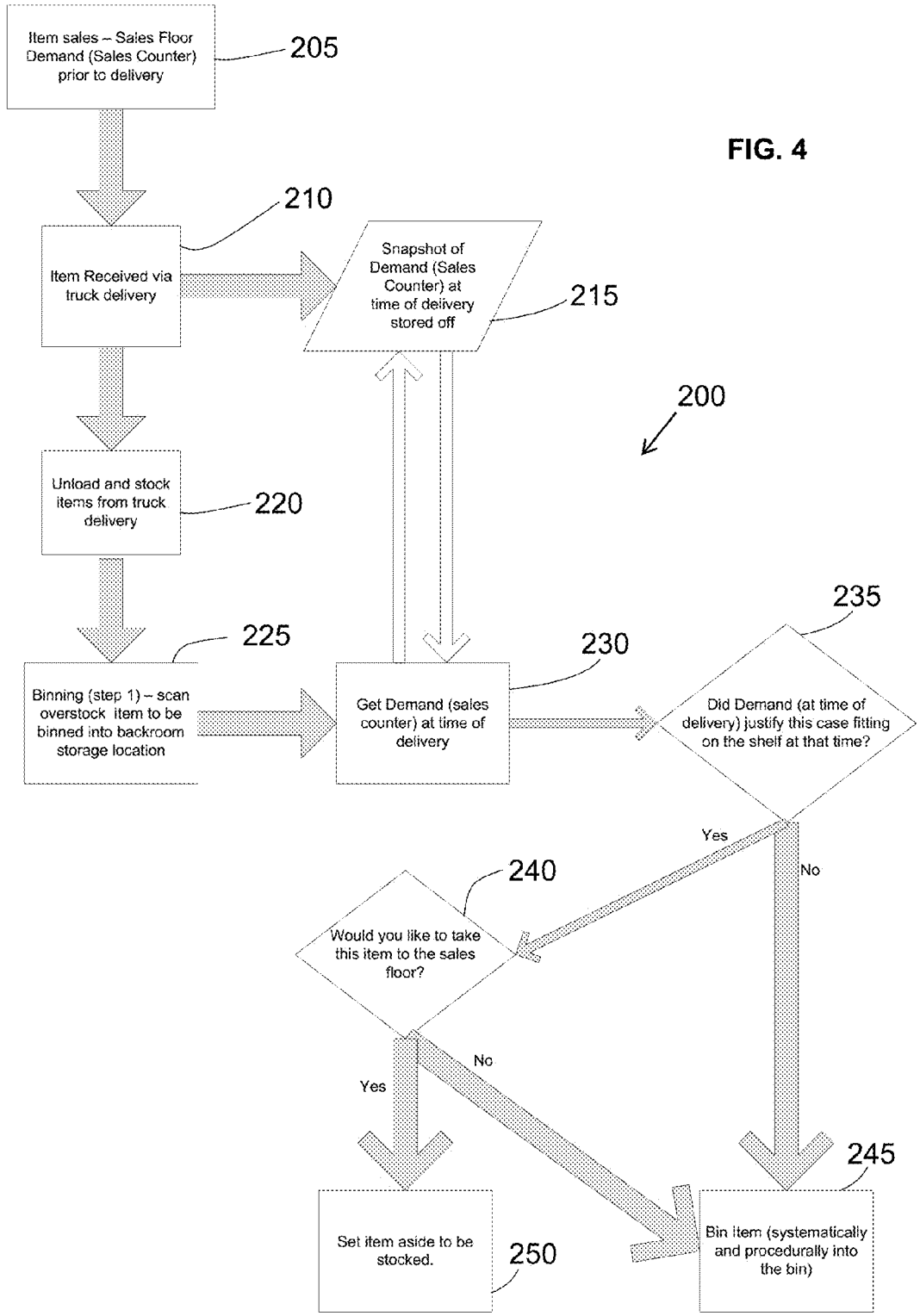
FIG. 4 is flow chart diagram of a method of managing products at a retail sales facility in accordance with several embodiments.

An exemplary method 200 of managing and stocking of products at the retail sales facility 12 will now be described with reference to FIGS. 1 and 4. Prior to delivery of items 90 (e.g., via a delivery truck) to the retail sales facility 12, consumer demand for the items identical to the "to be delivered" items 90 is recorded at the retail sales facility 12 (step 205), for example, by updating the inventory management database 42 to reflect the quantity of the items sold at the retail sales facility 12. Such updates may occur when a point-of-sale device (e.g., register or mobile phone) sends a signal to the local server 40 following each sale of the items identical to the item 90 at the retail sales facility 12.

When the item 90 is received at the retail sales facility 12 via a delivery truck (step 210), the item 90 is unloaded from the truck and initially scanned (step 220) and a snapshot of the demand (i.e., actual sales as reported from the point-of-sale device at the sales counter) for the item 90 at the retail sales location 12 is taken (step 215). Appropriate number of units of the delivered item 90 may then be stocked onto a shelf 82 on the sales floor containing items identical to the item 90 and the remaining items 90 may be designated as "overstock."

When a stocking associate scans overstock items (designated for binning in storage bins in the stock room) by scanning the overstock item 90 using the mobile scanner 20 (step 225), the mobile scanner 20 can communicate with the local server 40 to obtain the demand (i.e., based on the earlier snapshot) for the item 90 at the retail sales location 12 (step 230). Based on the demand information received at the mobile scanner 20 from the inventory management database 42 at the local server 40, the processor of the control unit 22 of the mobile scanner can determine whether the demand at the time of delivery justify the item 90 fitting on the shelf 82 on the sales floor (step 235). If a determination is made by the processor of the control unit 22 that the demand at the time of delivery does not justify the item 90 fitting on the shelf 82, then the mobile scanner 20 would indicate to the associate that the scanned item 90 is to be binned in a storage bin in the stock room (step 245). The mobile scanner 20 would also present the associate with an option to enter information, which the mobile scanner 20 communicates to the local server 40, that the item 90 has been binned such that the inventory management database 42 is updated to reflect the actual location of the scanned item 90.

If a determination is made by the processor of the control unit 22 that the demand at the time of delivery justifies the item 90 fitting on the shelf 82, then the mobile scanner 20 would indicate to the associate that the scanned item 90 is to be returned to the shelf 82 on the sales floor instead of being binned in a storage bin in the stock room (step 240). The associate can then set the scanned item 90 aside (e.g., onto a "pick" cart) for delivery to the sales floor (step 250). The mobile scanner 20 would also present the associate with an option to enter information, which the mobile scanner 20 communicates to the local server 40, that the item 90 has been "picked" for delivery back to the sales floor and is not going to be binned in the stock room, such that the inventory management database 42 is updated to reflect the actual location of the scanned item 90.

If at step 240 the associate determines that, despite the determination by the processor of the control unit 22 that the demand at the time of delivery justifies the item 90 fitting on the shelf 82, the associate determines that other factors indicate that the item 90 should not be taken to the sales floor at that time, then the associate can bin the scanned item 90 in a storage bin in the stock room and enter information, which the mobile scanner 20 communicates to the local server 40, that the item 90 has been binned in the stock room, such that the inventory management database 42 is updated to reflect the actual location of the scanned item 90 (step 245). As such, the scanning of an item 90 in a by the mobile scanner 20 and the associated update of the inventory management database 42 regarding the location of the item 90 effectively provides an audit of the items 90 at the retail sales location 12 such that an associate scanning the item 90 in the future knows whether the item 90 is located in its proper location or misplaced.

It will be appreciated that the methods 100 and 200 discussed above are not only usable to scan items being binned (e.g., initially unloaded from a delivery truck, brought to the sales floor and designated as "overstock" based on a determination by an associate that no shelf space on the sales floor is available for the items), but may be advantageously used also during unloading of a shipment of items to the retail sales facility 12 from a delivery truck. For example, the demand for the items 90 being scanned as they are unloaded from a delivery truck may be reset at the time of delivery of the items 90 by the truck (e.g., at 3 p.m. on a given day) to the retail sales facility 12. This calculated demand may be used to create an alert on the mobile scanner 20 for the products 90 coming off the delivery truck as the products 90 are scanned by the inventory management associate in the unloading area. In response to the alert, the inventory management associate or a mechanical device may sort the delivered products 90 onto pick carts that go out to the sales floor for placement on the display shelves or onto carts or bins that go to the stockroom for storage. Such sorting and management could be done prior to checking the shelf 82 on the sales floor, advantageously improving the sorting of the delivered products by saving the associates from going onto the floor to determine available shelf space.

As described herein, the system and methods described herein provide for easy and efficient management of inventory at a retail sales by determining and informing the binning associate whether the scanned item can fit on a shelf on the sales floor. The system's determination that the item can fit on the shelf on the sales floor can generate a visible or audible signal for the associate to pick the item from the stocking bin and transfer the item to the shelf on the sales floor. This improves stocking efficiency by avoiding situations where the associate stocks the item in a storage bin in the back room while the shelf on the sales floor has empty spaces where this item can be placed.

The determination that the item fits on the shelf on the sales floor may be advantageously used to adjust the demand for the item at the retail sales facility for future considerations of consumer demand and auditing of the items at the retail location. The system also logs information indicating if the associate acknowledged the alert to pick the item from being binned and return the item to the sales floor instead of storing the item in a bin in the stock room, which advantageously allows the system to determine a metric for the quality of stocking work by the associates Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for evaluating whether products are to be binned into stock room bins at a retail facility or displayed on a sales floor of the retail sales facility, the apparatus comprising:
   a reader configured to scan at least one product at the retail sales facility; and
   a control unit including a processor and configured to:
   receive data from a scan of the at least one product by a worker at the retail sales facility using a hand-held electronic device including a processor to facilitate a determination of whether the at least one product is to be binned into a stock room storage bin or displayed on the sales floor;
   obtain a demand for the at least one product from a time products identical to the scanned at least one product were delivered to the retail facility;
   estimate whether the demand for the at least one product supports displaying the at least one product on the sales floor of the retail sales facility or binning the at least one product in a stock room storage bin;
   output, when the demand supports displaying the at least one product on the sales floor, an indication to the worker that there is available sales floor space for the at least one product to be displayed; and
   output, when the demand supports binning the at least one product in the stock room storage bin, an indication to the worker that the at least one product is to be binned in the stock room storage bin.

2. The apparatus of claim 1, wherein the control unit is configured to transmit a signal to an inventory management database to indicate whether the at least one product is to be binned in the stock room storage bin or to be displayed in the available space on the sales floor.

3. The apparatus of claim 1, wherein the control unit is configured to mark the at least one scanned product as being one of binned in the stock room storage bin and displayed on the sales floor in the inventory database.

4. The apparatus of claim 1, wherein the processor is programmed to estimate the demand by obtaining at least one of: a quantity of products identical to the at least one scanned product delivered to the retail sales facility at a last delivery, a quantity of the products identical to the at least one scanned product binned in the stock room storage bin after the last delivery, a quantity of the products identical to the at least one scanned product being marked for binning in the stock room storage bin after placement of the products identical to the at least one scanned product on the sales floor of the retail sales facility, a quantity of the products identical to the scanned product sold at the retail sales facility since the last delivery, and a quantity of the products identical to the at least one scanned product removed from the stock room storage bin since the last delivery.

5. The apparatus of claim 1, wherein the control unit is configured to generate one of an audible alert and a visually displayed message at the held-held electronic device in response to a determination that space is presently available for the at least one scanned product on a product shelf located on the sales floor of the retail sales facility.

6. The apparatus of claim 5, wherein the control unit is configured to generate an automatic pick, from the stock room storage bin, for the at least one scanned product in response to the at least one scanned product not being displayed on the sales floor in response to the audible alert or the visually displayed message.

7. The apparatus of claim 6, wherein the control unit is configured to monitor whether the at least one scanned product was displayed on the sales floor in response to the audible alert or the visually displayed message, generate a data point indicating that the at least one scanned product was not displayed on the sales floor in response to the audible alert, and create a report including a plurality of the data points over a predetermined period of the monitoring.

8. The apparatus of claim 1, wherein the control unit is configured to analyze the scan of the at least one product at one or both of the hand-held electronic device and a server in communication with the hand-held electronic device.

9. A system for replenishing inventory on a sales floor of a retail sales facility, the system comprising:
an inventory database configured to store data associated with products displayed on the sales floor of the retail sales facility and with products stored in a stock room of the retail sales facility;
at least one computing device including a programmable processor coupled to the inventory database and configured to:
detect, based on the data obtained from the inventory management database, at least one sale of at least one product on the sales floor;
determine, in response to the detected at least one sale of at least one product on the sales floor, that storage space is available on the sales floor for at least one unit of the at least one product sold on the sales floor; and
output, in response to the detected at least one sale of at least one product on the sales floor and in response to the determination that storage space is available on the sales floor for at least one unit of the at least one product sold on the sales floor, a pick instruction to a worker at the retail sales facility indicating that the at least one unit of the at least one product sold on the sales floor is to be picked from the stock room and brought onto the sales floor for replenishment and display in the storage space determined to be available on the sales floor.

10. The system of claim 9, wherein the at least one computing device is configured to transmit a signal to the inventory database to indicate whether the at least one product is to be binned in the stock room storage bin or to be displayed in the available space on the sales floor.

11. The system of claim 9, wherein the at least one computing device is configured to mark the at least one scanned product as being one of binned in the stock room storage bin and displayed on the sales floor in the inventory database.

12. The system of claim 9, wherein the at least one computing device is configured to generate one of an audible alert and a visually displayed message at a held-held electronic device at the retail sales facility in response to a determination that space is presently available for the at least one scanned product on a product shelf located on the sales floor of the retail sales facility.

13. The system of claim 12, wherein the at least one computing device is configured to generate an automatic pick, from the stock room storage bin, for the at least one scanned product in response to the at least one scanned product not being displayed on the sales floor in response to the audible alert or the visually displayed message.

14. The system of claim 13, wherein the at least one computing device is configured to monitor whether the at least one scanned product was displayed on the sales floor in response to the audible alert or the visually displayed message, generate a data point indicating that the at least one scanned product was not displayed on the sales floor in response to the audible alert, and create a report including a plurality of the data points over a predetermined period of the monitoring.

15. A method for replenishing inventory on a sales floor of a retail sales facility, the method comprising:
providing an inventory database configured to store data associated with products displayed on the sales floor of the retail sales facility and with products stored in a stock room of the retail sales facility;
providing at least one computing device including a programmable processor coupled to the inventory database;
detecting, via the at least one computing device and based on the data obtained from the inventory management database, at least one sale of at least one product on the sales floor;
determining, via the at least one computing device and in response to the detected at least one sale of at least one product on the sales floor, that storage space is available on the sales floor for at least one unit of the at least one product sold on the sales floor; and
outputting, via the at least one computing device and in response to the detected at least one sale of at least one product on the sales floor and in response to the determination that storage space is available on the sales floor for at least one unit of the at least one product sold on the sales floor, a pick instruction to a worker at the retail sales facility indicating that the at least one unit of the at least one product sold on the sales floor is to be picked from the stock room and brought onto the sales floor for replenishment and display in the storage space determined to be available on the sales floor.

16. The method of claim 15, further comprising transmitting, via the at least one computing device, a signal to the inventory database to indicate whether the at least one product is to be binned in the stock room storage bin or to be displayed in the available space on the sales floor.

17. The method of claim 15, further comprising marking, via the at least one computing device, the at least one scanned product as being one of binned in the stock room storage bin and displayed on the sales floor in the inventory database.

18. The method of claim 15, further comprising generating, via the at least one computing device, one of an audible alert and a visually displayed message at a held-held electronic device at the retail sales facility in response to a determination that space is presently available for the at least one scanned product on a product shelf located on the sales floor of the retail sales facility.

19. The method of claim 18, further comprising generating, via the at least one computing device, an automatic pick, from the stock room storage bin, for the at least one scanned product in response to the at least one scanned product not being displayed on the sales floor in response to the audible alert or the visually displayed message.

20. The method of claim 19, further comprising monitoring, via the at least one computing device, whether the at least one scanned product was displayed on the sales floor in response to the audible alert or the visually displayed message, generating a data point indicating that the at least one scanned product was not displayed on the sales floor in response to the audible alert, and creating a report including a plurality of the data points over a predetermined period of the monitoring.

* * * * *